M. R. SKINNER.
Swivel-Hook for Tightening and Connecting Ropes.

No. 224,738. Patented Feb. 17, 1880.

WITNESSES:
C. Neveux
C. Sedgwick

INVENTOR:
M. R. Skinner
BY Munn & Co
ATTORNEYS.

UNITED STATES PATENT OFFICE.

MERRILL R. SKINNER, OF FOSTER BROOK, PENNSYLVANIA, ASSIGNOR TO HIMSELF AND JAMES S. ROGERS, OF SAME PLACE.

SWIVEL-HOOK FOR TIGHTENING AND CONNECTING ROPES.

SPECIFICATION forming part of Letters Patent No. 224,738, dated February 17, 1880.

Application filed September 22, 1879.

*To all whom it may concern:*

Be it known that I, MERRILL R. SKINNER, of Foster Brook, in the county of McKean and State of Pennsylvania, have invented a new and Improved Swivel-Hook for Tightening and Connecting Ropes and Cables, of which the following is a specification.

The object of my invention is to provide a swivel-hook for connecting and tightening ropes and cables without removing the same from the pulleys or shafting, and which shall be simple in construction and effective and convenient in use.

The invention consists of a swivel-hook the parts of which have combined with them a ratchet-wheel arrangement, whereby ropes or cables connected with the hook may be tightened or shortened by twisting, as will be hereinafter fully described.

Figure 1:
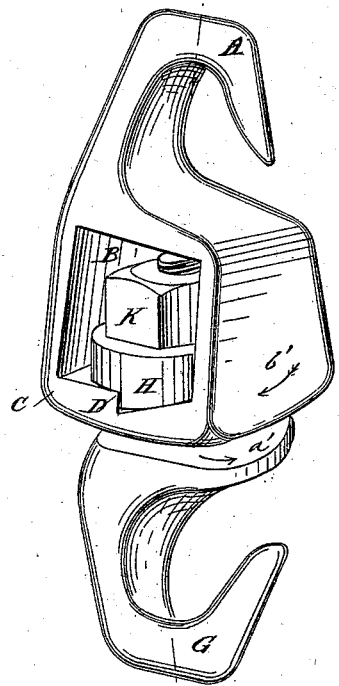
Figure 2:
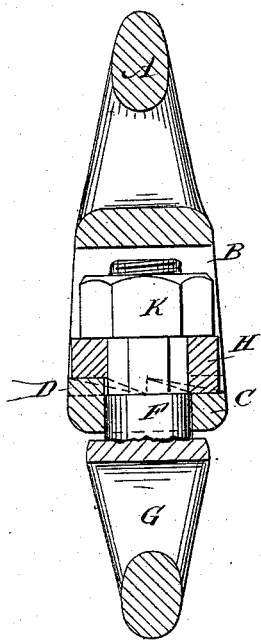
Figure 3:
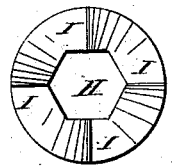

In the accompanying drawings, Figure 1 is a perspective view of the swivel-hook. Fig. 2 is a vertical cross-section of the same. Fig. 3 is a bottom view of the ratchet-wheel.

A represents a hook, the shank of which is enlarged so as to form the eye B, having a ratchet-tooth, D, extending across the bottom of the same. The bottom is also provided with a circular aperture, through which the pin F, attached to the hook G, passes. That part of the pin F that is surrounded by the bottom of B is circular in cross-section; but the part immediately above is hexagonal, corresponding to the cross-section of the hole in the ratchet-wheel H, so that the ratchet-wheel rotates with the pin F, which passes through it.

The upper end of the pin is threaded and provided with a nut, K, which prevents the two hooks A and G from separating. The ratchet-wheel H is provided with teeth I, which are perpendicular to the plane of the wheel.

The device operates as follows: The ends of the rope or cable are attached to the hooks A and G. Whenever one of the ropes has slackened or stretched, the hook G is rotated in the direction of the arrow $a'$, or the hook A in the direction of $b'$, until the rope that is attached to these hooks has been twisted sufficiently to shorten or tighten it.

The teeth I of the ratchet-wheel H will glide over the ratchet-tooth D as long as the rope is twisted in one direction, but will immediately catch on this ridge as soon as the rope untwists and stops further untwisting.

This device will be of special service for rope-belt connections, for bull-ropes in well-drilling machines, and in numerous similar cases, for the ropes can be tightened as desired by twisting them in one direction, and need not be removed from the pulleys or shafting, as was necessary heretofore.

Having thus described my invention, I claim as new and desire to secure by Letters Patent—

1. The within-described swivel-hook, consisting of the part A, provided with an eye, B, having a ratchet-tooth, D, on its bottom, and of the part G, provided with a pin, F, and a ratchet-wheel, H, substantially as herein described, and for the purposes set forth.

2. The combination of the hook A, provided with an eye, B, and a ratchet-tooth, D, on the bottom of the same, with the hook G and ratchet-wheel H, substantially as herein described, and for the purpose set forth.

MERRILL ROBERT SKINNER.

Witnesses:
C. S. BROWN,
J. E. BELLINGER.